United States Patent [19]

Homen

[11] Patent Number: 4,696,360
[45] Date of Patent: Sep. 29, 1987

[54] WEIGHING APPARATUS AND METHOD FOR USE IN WEIGHING LIVE FISH

[76] Inventor: Manny Homen, 5798 E. Paseo Cimarron, Tucson, Ariz. 85715

[21] Appl. No.: 895,129

[22] Filed: Aug. 11, 1986

[51] Int. Cl.$^4$ ............... G01G 21/22; G01G 23/00
[52] U.S. Cl. .................................. 177/262; 177/1; 177/161
[58] Field of Search ............... 177/1, 161, 163, 262, 177/244

[56] References Cited

U.S. PATENT DOCUMENTS 1,866,683  7/1932  Tinnes ..................... 177/262
1,992,262  2/1935  Upp ......................... 177/244 X Primary Examiner—George H. Miller, Jr.
Attorney, Agent, or Firm—Harry M. Weiss & Associates

[57] ABSTRACT

An improved weighing apparatus and method of weighing a live fish is disclosed. Here, the weighing apparatus and method has a container member having swingably coupled cover member thereabove and a guide member coupled therebelow a base member of the container. The guide member of the container is provided to allow the container to be slidably mounted thereabove a weighing scale having a capacity to provide a weight readout to nearest one-tenth of an ounce and a maximum capacity of at least 200 ounces. The weighing scale of the improved improved weighing apparatus of the present invention is preferably battery operated or suitable for being electrically operated, as well as being compact, portable, lightweight and easily transportable. The improved weighing apparatus and method of the present invention provides a rapid, accurate and efficient means to weigh a struggling live fish for use particularly by sports fisherman in fishing tournaments or for merchants in fishing markets.

13 Claims, 4 Drawing Figures

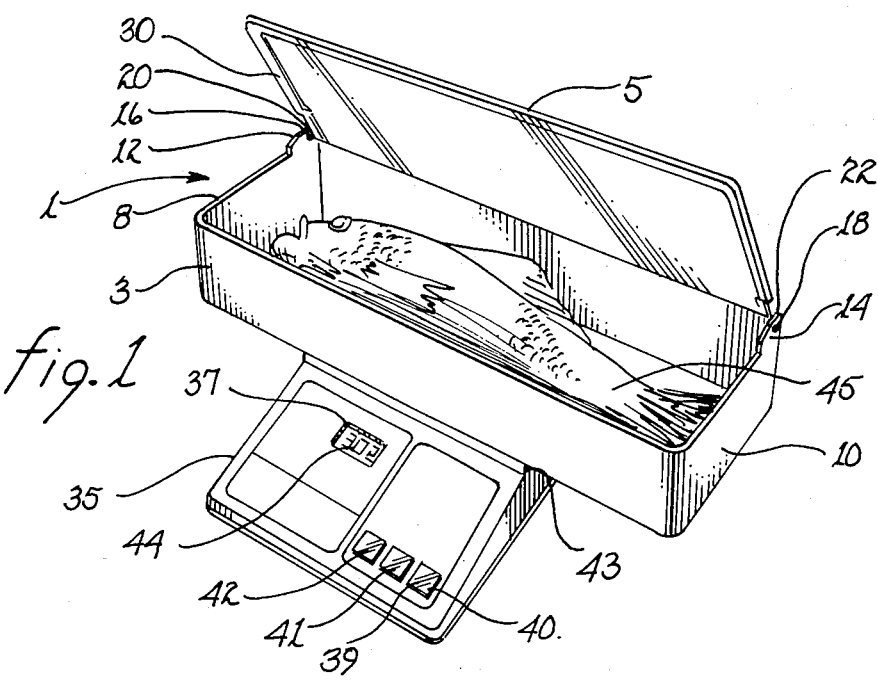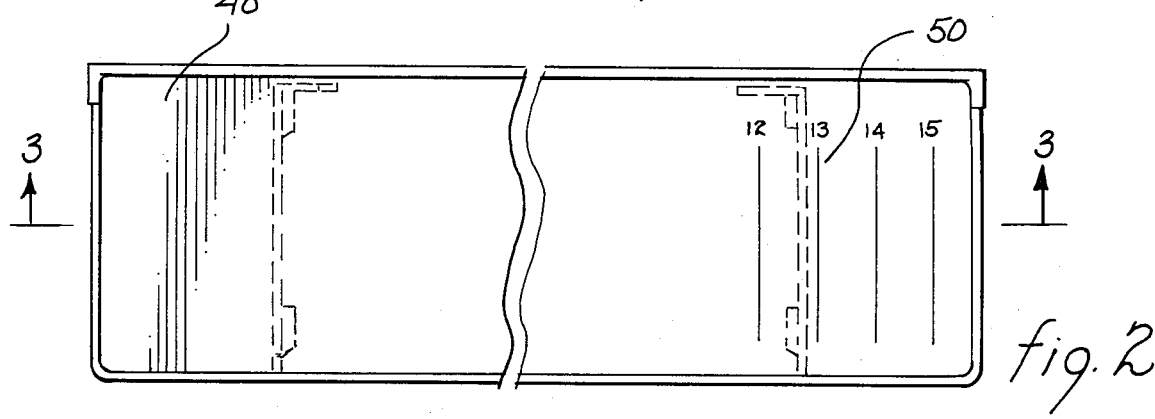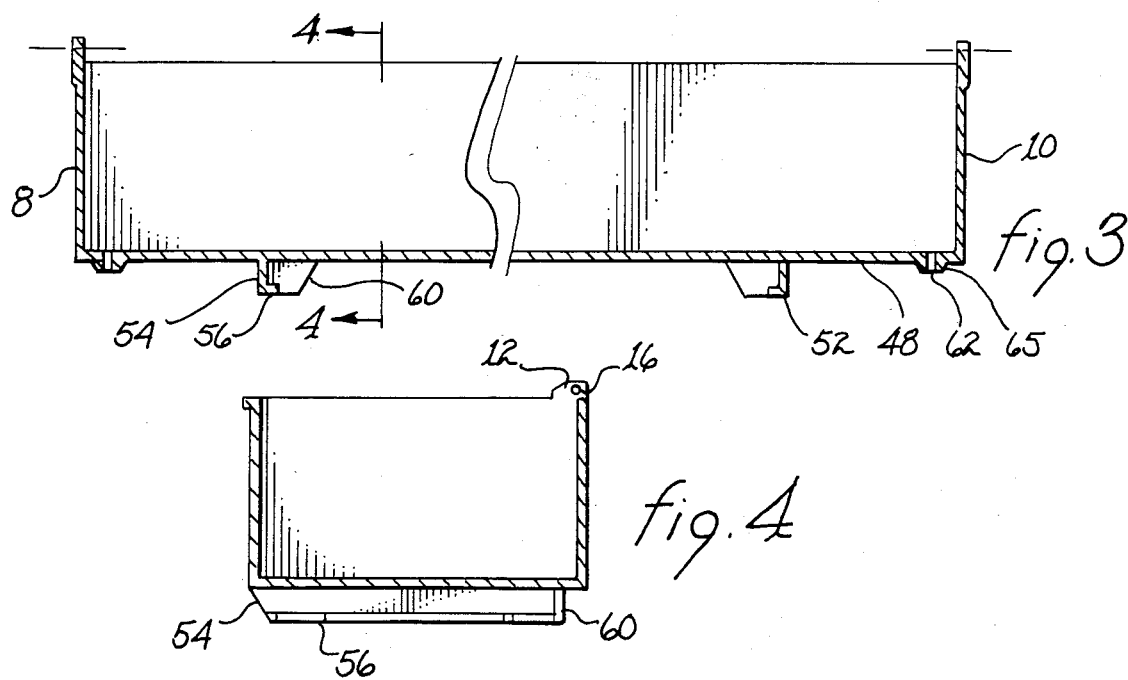

WEIGHING APPARATUS AND METHOD FOR USE IN WEIGHING LIVE FISH

BACKGROUND OF THE INVENTION

This invention relates generally to an improved apparatus and method for use in weighing live fish. More particularly, the improved apparatus and method has a container having swingably coupled cover member, as well as a guide member integral to the base member thereof for slidably mounting onto a platform of a weighing scale.

Often, live fish is difficult to weigh due to its constant struggle and vociferous movement. The struggle of a fish when placed out of water is instinctive due to its efforts in wanting to return to a water environment in order to survive. In many instances, the struggle of a fish when placed out of water is so fierce that in certain cases, such as in sports fishing, sports fishermen exhilarate in the feeling of a struggling fish at the end of their fishing line. Such an exhilaration has become so enjoyable that many sports fishermen pursue, even to the point of travelling numerous miles, larger fish which can provide the fiercest struggles.

However, in most instances, a struggling fish is a significant disadvantage. In many instances, for example, wherein contests are held which award a fishermen who has caught the largest and heaviest fish, weighing of the fish which has just been caught becomes problematic. Often, the fish is tied by a string, either at the base of its caudal or hind fin for through it jaw and through an opening behind its operculum in order for it to be weighed. Moreover, the struggling fish may be hooked by piercing any part of its body and thereafter placed on or under the weighing scale.

Also, in locations where fresh fish is bought wherein the price may depend on the weight of the fish, merchants have similar problems in weighing a struggling fish. Not only are they confronted with the above-discussed problems, there is also a great tendency for the struggling fish to disturb the reading from a weighing scale. Moreover, the tying or hooking of the fish, as above-described, is so cumbersome that their uses become significantly impractical when speed and accuracy are required in weighing a live struggling fish, such as in common instances of weighing a fish in fishing tournaments or in fresh fish markets.

In fishing tournaments, contestants are often required to bring ashore live fish for weighing. Moreover, they are required only to bring ashore a limited number of fish for weighing. Accordingly, there is a dire need to have easy access to an improved weighing apparatus suitable for weighing a live struggling fish, preferably aboard a fishing boat, in order to immediately weigh fish which has just been caught and retain the more desirable fish for weighing.

Moreover, many fishing tournaments require that fish caught to be thrown back to the body of water in substantially the same condition when caught in order to preserve and conserve the fish resources for future generations of fishermen. In order to attain the goal of conserving and preserving fish, either as required by local rules and laws or due to personal good faith moral values, it is essential therefore that the fish be weighed immediately after being caught in order for the fish not to sustain unnecessary damage prior to being returned to the water.

Furthermore, in fishing tournaments, thousands of dollars can be lost by the mere difference of a tenth of an ounce in the recorded weights of fish brought in by contestants.

Accordingly, there is a dire need to provide an improved weighing apparatus and method for weighing live struggling fish which will avoid the above-described problems. The improved weighing apparatus should have a container with a swingable cover member therefore, as well as a guide member integral therebelow its base member for slidably coupling to a platform of a weighing scale.

SUMMARY OF THE INVENTION

It is an object of this invention to provide an improved weighing apparatus suitable for efficient and rapid weighing of a live struggling fish.

It is still an object of this invention to provide an improved weighing apparatus which has a swingable cover member thereabove in order to retain said fish being weighed.

It is still and object of this invention to provide an improved weighing apparatus which has an integral guide member therebelow its base member to allow said apparatus to be slidably accommodated thereabove a platform of a weighing scale.

It is yet another object of this invention to provide an improved weighing apparatus which is suitable for weighing a live struggling fish thereabove a weighing scale having an accuracy at the nearest one-tenth of an ounce.

It is yet another object of this invention to provide an improved weighing apparatus which is durable in construction, inexpensive and easy to manufacture.

It is yet a further object of this invention to provide an improved weighing apparatus for weighing a live struggling fish thereabove a highly compact, portable and easily transportable weighing scale, preferably battery operated for suitable for being electrically operated.

It is yet a further object of this invention to provide an improved weighing apparatus for weighing a live struggling fish thereabove a weighing scale suitable of providing a weight in digital readout form, as well as holding said digital readout for a desired period of time.

In accordance with one embodiment of this invention, a container member having a swingable cover member thereabove, as well as a guide member preferably integrally coupled therebelow is disclosed. The container is suitable for accommodating therein a live struggling fish. The guide member is provided to allow the container to be slightly mounted onto a platform of a weighing scale. The conventional weighing scale preferably has a digital readout, suitable for reading a weight to the nearest one-tenth of an ounce. Moreover, the weighing scale is preferably battery operated or suitable for being electrically operated. Also, the weighing scale has a digital readout which can be held for desired period of time.

The foregoing and other objects, feature and advantages of this invention will be apparent from the following, more particular, description of the preferred embodiments of this invention, as illustrated in the accompanying drawings.

BRIEF DESCRIPTION OF THE DRAWINGS

FIG. 1 is a perspective view of a weighing apparatus of the present invention showing a container member with an associated fish accommodated therein mounted thereabove a compact, portable, lightweight and readily transportable weighing scale.

FIG. 2 is a top elevational view of the container member showing thereon integral measurement scales thereon.

FIG. 3 is a cross-sectional view taken along line 3—3 of FIG. 2 showing the internal portion of the container member.

FIG. 4 is a cross-sectional view taken along line 4—4 of FIG. 3 showing the internal portion of the container member.

DETAILED DESCRIPTION OF THE PREFERRED EMBODIMENTS

In FIG. 1, a container member, generally referred to by reference number 1, is shown having a body member 3 with a cover member 5 thereabove. At least two side members 8, 10 of the body member 3 have an upper end edge portions 12, 14, respectively, with an aperture 16, 18 passing through each of the upper end edge portion 12, 14, respectively (see also FIG. 4 infra). Each aperture 16, 18 is suitable for preferably accommodating an extending member 20, 22 protruding from each end of the cover member 5 to allow the cover member 5 to be swingably coupled to the side members 8, 10 of the container member 1. Therealong the edges of the inner surface of the cover member 5 is a guide member 30 to permit the cover member 5 to be seated thereabove the side members 8, 10 of the container member 1. Preferably thereabove the cover member 5 is a handle member (not shown) integral thereto to permit the cover member 5 to be swingably opened or closed.

Also shown in FIG. 1 a weighing scale 35 (e.g., an EQUALIZER SCALE Model MS-1 made available by Weigh-In, Inc. of Tucson, Ariz.) preferably having a digital readout display panel member 37, as well as control panel protionn 40. The weighing scale 35 is preferably compact, portable, lightweight and readily transportable. Also, the weighing scale 35 is preferably suitable for providing a weight reading having an accuracy of within one-tenth of an ounce and a maximum reading capacity of at least 200 ounces. Moreover, the weighing scale 35 is preferably battery operated for easy transportability or suitable for being electrically operated. Further, the weighing scale 35 has an "ON" control button or switch 39, as well as an "OFF" control button or switch 41. It is also preferred that the weighing scale 35 has a "HOLD" button or switch 42 for holding a digital readout 44 from the digital readout display panel member 37. Thereabove the weighing scale 35 is a platform member 43 for accommodating thereabove the container member 1 having a live fish 45 therein to be weighed.

As illustrated in FIG. 2, the container member 1 has a base plate member 48 integrally coupled therebelow. On the upper surface of the base plate member 48 is a scale 50, preferably integral thereto, for use in measuring the length of the fish 45 placed inside the container member for weighing.

The widthwise cross-section of the container member 1 is shown in FIG. 3 illustrating therein bottom guide members 52 preferably having an extending vertical portion 54 and an extending horizontal portion 56. The bottom guide members 52 would permit the container member 1 thereabove to be slidably mounted on the platform member 43 of the weighing scale 35. Here, the side edges of the platform member 43 are accommodated within the bottom guide members 52.

Moreover, the bottom guide members 52 have a back portion 60 integral to the base plate member 48, the extending vertical portion 54 and the extending horizontal portion 56 (see also FIG. 4 infra). Further, at least one aperture 62 passes therethrough the base plate member 48, preferably through a portion of the base plate member 48 which is not above the platform member 43 of the weighing scale 35 in order to permit any water inside the container 1 to be dispensed therefrom for a more accurate weight reading from the weighing scale 35. Preferably, therebelow the aperture 62 is a protruding member 65 therealong for leading out the undesired water therefrom.

It is preferred that the container member 1 is made of a lightweight material, such as plastic or the like. Similarly, it is preferred that the weighing scale 35 has an exterior portion made of lightweight material, such as plastic or the like.

While the invention has been particularly shown and described to preferred embodiments thereof, it will be understood by those skilled in the art that changes in form and details may be made therein without departing from the spirit and scope of the invention.

I claim:

1. A weighing apparatus for use in weighing live fish, comprising:
   a container means having a base member for accommodating therein said live fish;
   a cover member means for swingably coupling thereabove said container means;
   a guide member means for coupling therebelow said base member; and
   a weighing scale means for slidably coupling thereabove said container means, said guide member means is suitable for guiding said container means when said container means is slidably mounted thereabove said weighing scale means.

2. The weighing apparatus as in claim 1 wherein said guide member means is integrally coupled to said base member.

3. The weighing apparatus as in claim 2 wherein said weighing scale means is digital suitable for providing a weight reading within one-tenth of an ounce and a maximum reading capacity of at least 200 ounces.

4. The weighing apparatus as in claim 3 wherein said weighing scale means is battery operated.

5. The weighing apparatus as in claim 3 wherein said weighing scale means is suitable for being electrically operated.

6. The weighing apparatus as in claim 3 wherein said weighing scale is suitable for holding said weight reading for a desired time period.

7. The weighing apparatus as in claim 6 wherein said container means is made of light weight material.

8. A method of weighing a live fish, comprising the steps of:
   providing a container member means having a swingably coupled cover member means thereabove;
   providing a weighing scale;
   slidably engaging said container member means thereabove said weighing scale;
   placing a live fish inside said container member means;
   closing said cover member means thereabove said container member means; and thereafter reading the weight of said fish provided by a readout of said weighing scale.

9. The method of weighing a live fish as in claim 8 wherein said step of providing a container member means comprises the step of providing a container member means made out of lightweight material.

10. The method of weighing a live fish as in claim 9 wherein said step of providing a weighing scale comprises the step of providing a weighing scale with a digital readout means suitable for providing a digital reading of a weight to the nearest tenth of an ounce and a weight reading maximum capacity of at least 200 ounces.

11. The method of weighing a live fish as in claim 10 wherein said step of providing a weighing scale comprises the step of providing a weighing scale which is battery operated.

12. The method of weighing a live fish as in claim 10 wherein said step of providing a weighing scale comprises the step of providing a weighing scale suitable for being electrically operated.

13. The method of weighing a live fish as in claim 10 wherein said step of providing a weighing scale comprises the step of providing a weighing scale having control panel means, said control panel means comprises an "ON-OFF" switch and a "HOLD" switch for holding said digital readout for a desired period of time.

* * * * *